(12) United States Patent
Unfried et al.

(10) Patent No.: US 6,981,566 B2
(45) Date of Patent: Jan. 3, 2006

(54) DRIVE ASSEMBLY FOR A MOTOR VEHICLE

(75) Inventors: Claus-Dieter Unfried, Markgroeningen (DE); Ulrich Huelsemann, Neuhausen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 31 days.

(21) Appl. No.: 10/350,104

(22) Filed: Jan. 24, 2003

(65) Prior Publication Data

US 2003/0173134 A1  Sep. 18, 2003

(30) Foreign Application Priority Data

Jan. 26, 2002 (DE) ................................ 102 02 956

(51) Int. Cl.
*B60K 5/00* (2006.01)

(52) U.S. Cl. ........................ 180/292; 180/312; 280/781

(58) Field of Classification Search ................ 180/312, 180/292; 280/781, 784, 785
See application file for complete search history.

(56) References Cited

U.S. PATENT DOCUMENTS

| 1,473,194 | A | * | 11/1923 | Mayer | 180/252 |
|---|---|---|---|---|---|
| 1,950,637 | A | * | 3/1934 | Taub | 180/292 |
| 4,706,901 | A | | 11/1987 | von Broock et al. | |
| 4,993,510 | A | | 2/1991 | Kato et al. | |
| 5,035,397 | A | | 7/1991 | Yamada | |
| 5,915,495 | A | | 6/1999 | Kerlin et al. | |

FOREIGN PATENT DOCUMENTS

| DE | 34 34 453 C2 | 12/1986 | | |
|---|---|---|---|---|
| EP | 0 295 661 A2 | 12/1988 | | |
| EP | 370342 | * 5/1990 | | 280/781 |
| EP | 0769420 | 4/1997 | | |
| FR | 787 834 | 9/1935 | | |
| GB | 2 270 661 A | 3/1994 | | |
| GB | 2 275 031 A | 8/1994 | | |
| JP | 07251686 | 10/1995 | | |
| JP | 2001347896 | 12/2001 | | |
| WO | WO 91/04184 | 4/1991 | | |
| WO | 00/26052 | 5/2000 | | |
| WO | 00/69687 | 11/2000 | | |

OTHER PUBLICATIONS

Search Report.

* cited by examiner

*Primary Examiner*—Eric Culbreth
(74) *Attorney, Agent, or Firm*—Crowell & Moring LLP

(57) ABSTRACT

This drive assembly is suitable for a motor vehicle, particularly a passenger car of the sportscar type, and comprises an internal-combustion engine, a clutch and a transmission which form a constructional unit. The drive assembly is fastened by means of several bearings on a carrying structure of a vehicle body of the passenger car.

For an advantageous installation of the drive assembly, a first bearing interacting with a first bearing receiving device of the carrying structure is provided approximately in a longitudinal center plane of the passenger car on a free side of the internal-combustion engine, in which case, a second bearing and a third bearing are mounted outside the longitudinal center plane in the area of a free end of the transmission, which hold second and third bearing receiving devices of the carrying structure in position.

16 Claims, 7 Drawing Sheets

DRIVE ASSEMBLY FOR A MOTOR VEHICLE

This application claims the priority of German Patent Document No. 102 02 956.3, filed Jan. 26, 2002, the disclosure of which is expressly incorporated by reference herein.

BACKGROUND AND SUMMARY OF THE INVENTION

The invention relates to a drive assembly for a motor vehicle, particularly a passenger car of the sportscar type.

GB 2 270 661 A discloses a drive assembly which is installed in a so-called mid-engine vehicle, specifically between a forward and a rearward wheel axle but adjacent to the rearward wheel axle. In this case, the drive assembly is formed by an internal-combustion engine, a clutch and a transmission with a differential gear. The drive assembly thus permits a compact construction of a passenger car of the sportscar type, such as a two-seat passenger car.

EP 0 295 661 A2 discloses a carrying structure of a motor vehicle's body, which is attached to a rearward area of a central frame structure and accommodates a drive assembly consisting of the internal-combustion engine and the transmission. By means of forward and rearward bearings, the drive assembly is arranged on both sides of a longitudinal center plane of the motor vehicle, and the carrying structure is connected to the center plane. The bearings are provided at the ends of bearing arms which extend away from the drive assembly.

It is an object of the invention to arrange a drive assembly for a motor vehicle in a carrying structure of a vehicle body such that it contributes to a favorable weight distribution of the motor vehicle, and conditions are created in order to advantageously mount the bearings between the drive assembly and the carrying structure and further develop them.

The principal advantages of the invention are that the bearings and the bearing receiving devices, as well as their arrangement on the carrying structure, achieve excellent results with respect to both driving dynamics and vibrations. In this case, the bearings and the bearing receiving devices can be implemented with acceptable expenditures, specifically when the carrying structure is formed by an enveloping device which includes a glass-fiber-reinforced plastic material. In this case, the first bearing receiving device of the first bearing may be integrated in an upright closing wall of the enveloping device, and this bearing receiving device may be constructed as a local thickening in the closing wall. The first bearing has a functionally appropriate construction because it has a carrying arm fastened to a cylinder wall of the internal-combustion engine and a console carrier mounted on the closing wall. The supporting elements between the console carrier and the carrying arm ensure that, in the event of an accident-caused relative movement acting upon the drive assembly, a targeted support of the carrying arm takes place on the console carrier.

Finally, the second bearing and the third bearing cooperate with second and third bearing receiving devices which can easily be worked into the carrying structure, and the connection of the second and the third bearing with the cross member and its linking to the transmission are permitted by clear design-related devices.

Other objects, advantages and novel features of the present invention will become apparent from the following detailed description of the invention when considered in conjunction with the accompanying drawings.

DETAILED DESCRIPTION OF THE DRAWINGS

Figure 1:
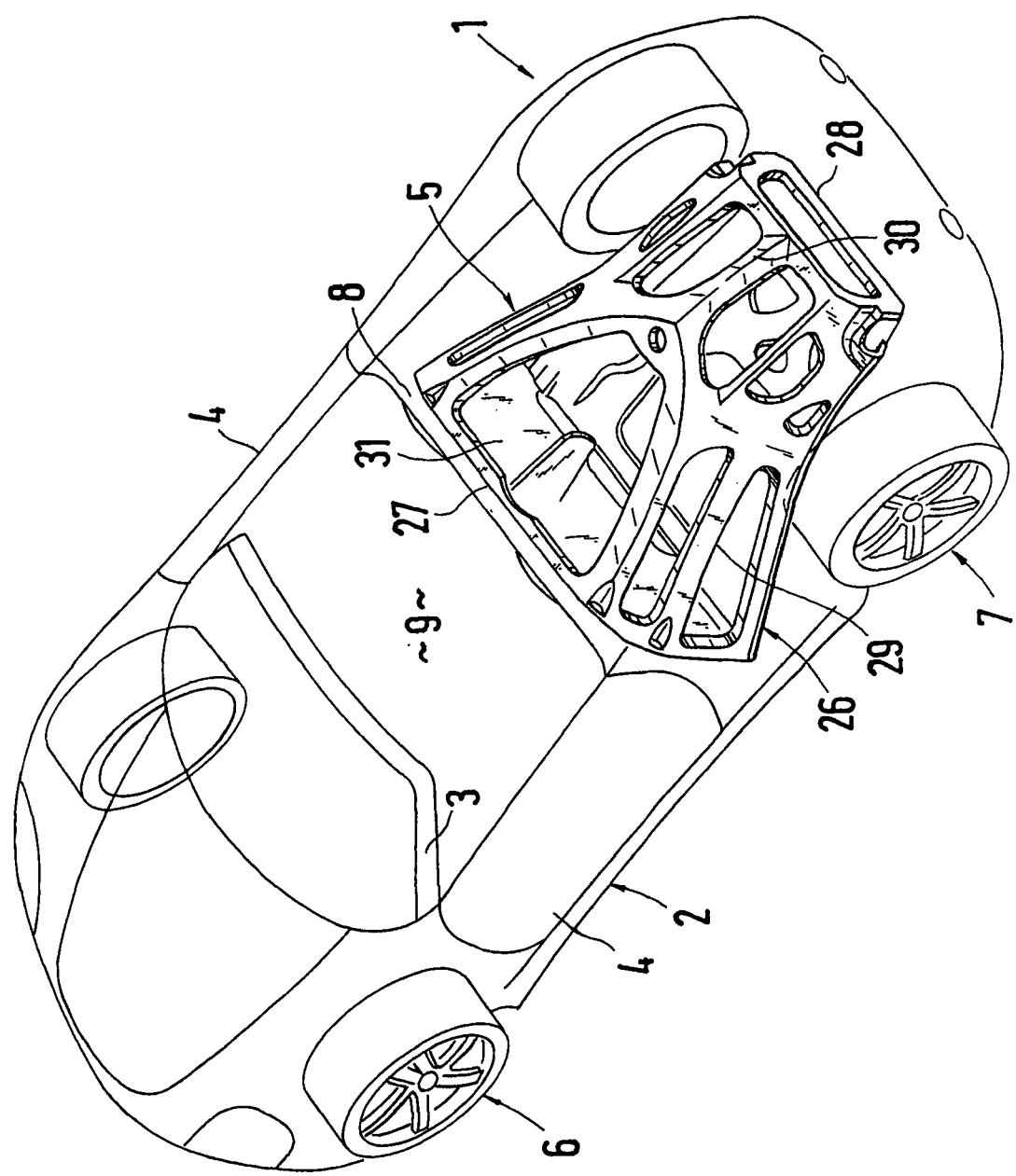
FIG. 1 is a diagonal view from the left rear of a vehicle which is constructed for accommodating a drive assembly.
Figure 2:
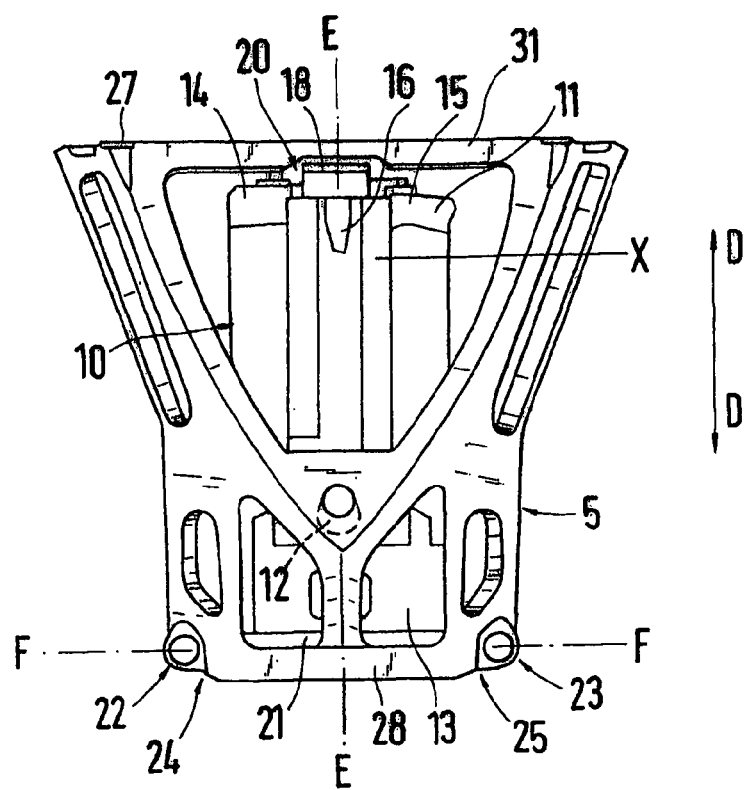
FIG. 2 is a partial top view of the motor vehicle into which the drive assembly is inserted.

A passenger car 1, such as a motor vehicle of the sportscar type, comprises a vehicle body 2 having a windshield 3, doors 4 and a rearward carrying structure 5. The vehicle body 2 is carried by front wheels 6 and rear wheels 7. The rearward carrying structure 5 is connected with a central carrying structure 8 which comprises a vehicle occupant compartment 9 having seats—not shown—arranged side-by-side, and is constructed for accommodating a drive assembly 10, as shown in FIG. 2. The drive assembly 10 is disposed between the front wheels 6 and the rear wheels but adjacent to the rear wheels 7 (i.e., the mid-engine construction) in the carrying structure 5, and it is formed by a preassembled constructional unit including the internal-combustion engine 11, the clutch 12 and the transmission 13. The internal-combustion engine 11 has V-shaped cylinder rows 14, 15 which are aligned in the longitudinal direction D—D of the vehicle. A horizontal housing wall 16 (shown in FIG. 3) of a crankcase 17 of the internal-combustion engine 11 extends between the cylinder rows 14, 15.

Figure 3:
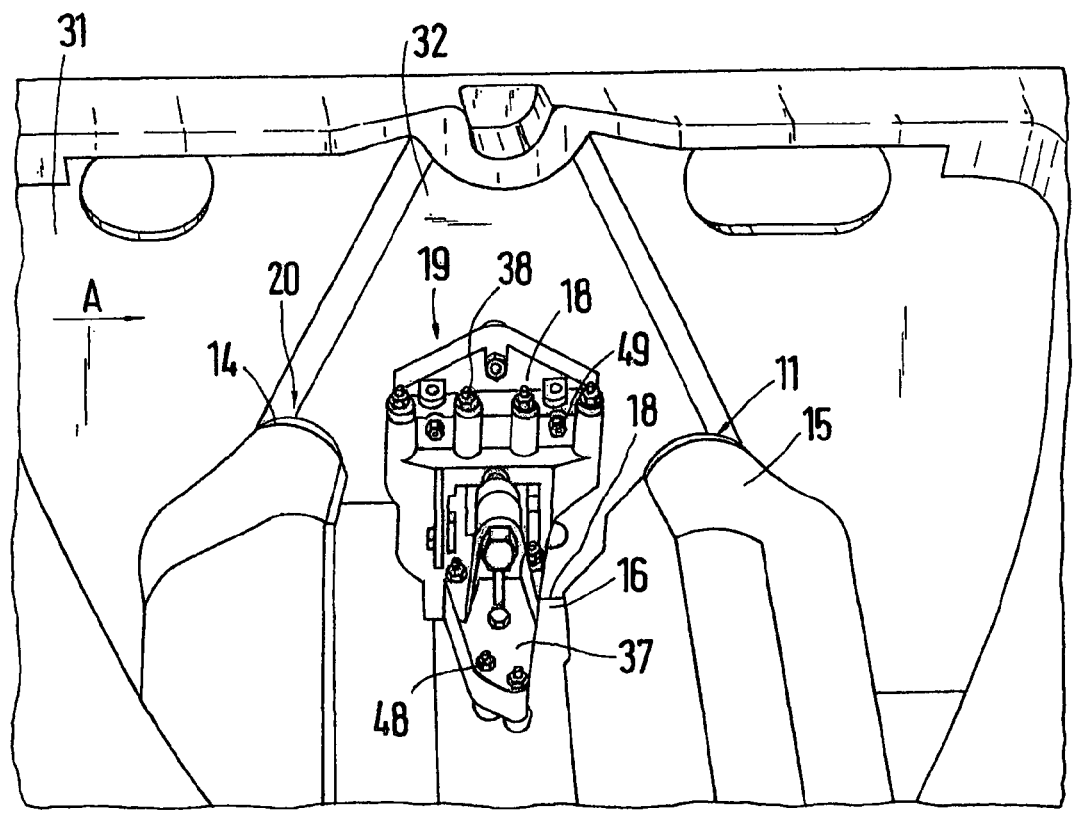
FIG. 3 is an enlarged diagonal view of a detail X of FIG. 2.

For fastening the drive assembly 10 on the carrying structure 5, a first bearing 18, shown in FIG. 3, is provided, which interacts with a first bearing receiving device 19 of the carrying structure 5. The bearing receiving device 19 extends approximately in a longitudinal center plane E—E, and is arranged on a free face 20 of the internal-combustion engine or a face 20 facing the vehicle occupant compartment 9. At a free end 21 of the transmission 13 away from the face 20, a second bearing 22 and a third bearing 23 are mounted which are situated outside the longitudinal center plane E—E of a transverse plane F—F and cooperate with a second bearing receiving device 24 and a third bearing receiving device 25 of the carrying structure 5.

The carrying structure 5 includes an enveloping device 26 which surrounds, for example, the drive assembly 10 at least in certain areas and which includes a high-strength material, particularly a glass-fiber-reinforced plastic material. The enveloping device 26 has a forward cross member 27 and a rearward cross member 28 which both extend around in a ring shape and between which several side members 29, 30 are situated. On the side facing the vehicle occupant compartment 9, the cross member 27 is provided with a closing wall 31 into which the first bearing receiving device 19 is integrated. The first bearing receiving device 19 is formed by a thickening 32, shown in FIGS. 3 and 4, in the closing wall 31 which also includes a glass-fiber-reinforced plastic material. Furthermore, the bearing receiving devices 24 and 25 are formed by shaped-in areas 33, 34 with horizontal bearing surfaces 35, 36 in the enveloping device 26, as shown in FIG. 6.

Figure 4:
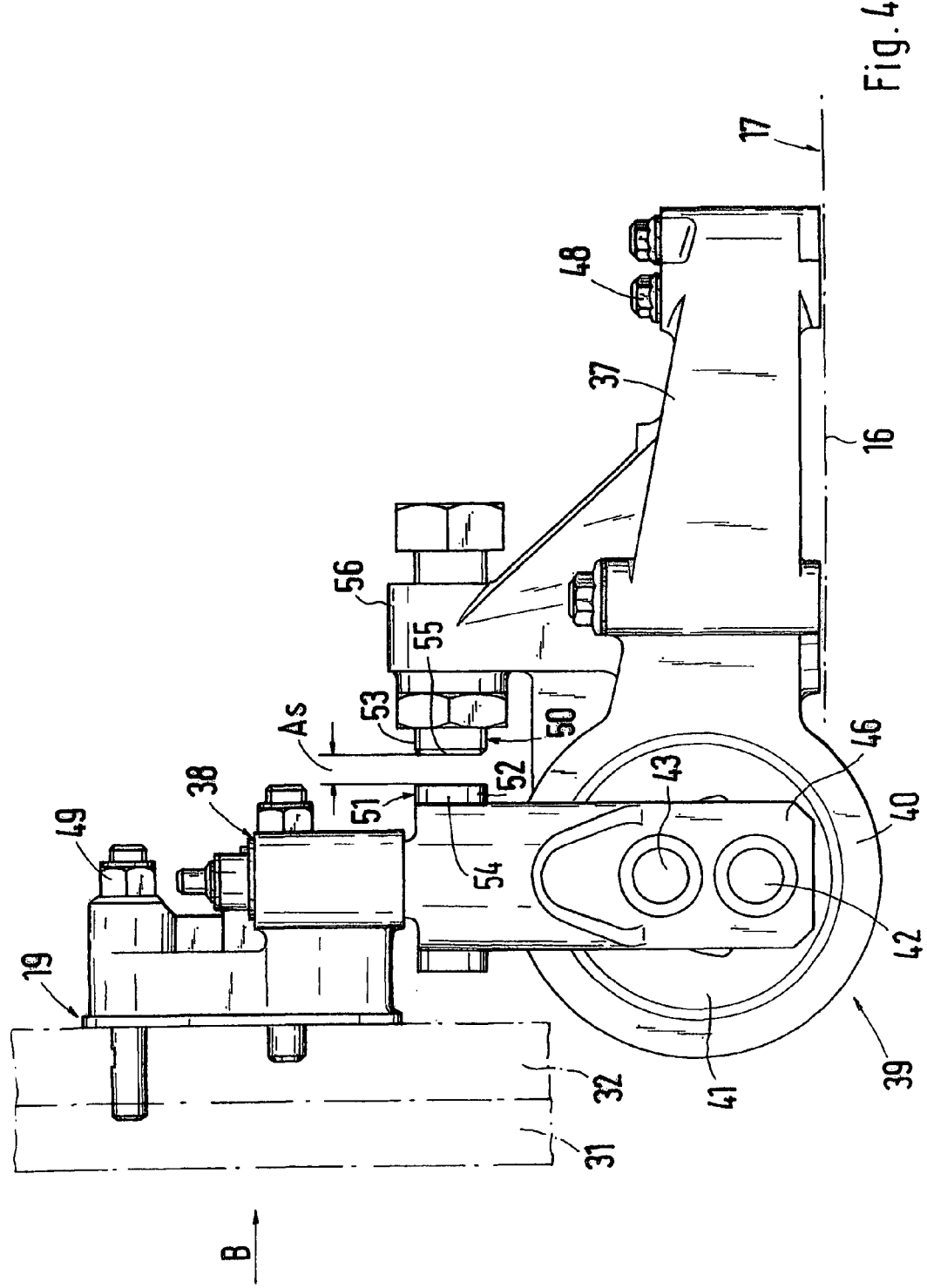
FIG. 4 is an enlarged view approximately in the direction of the arrow A of FIG. 3.
Figure 5:
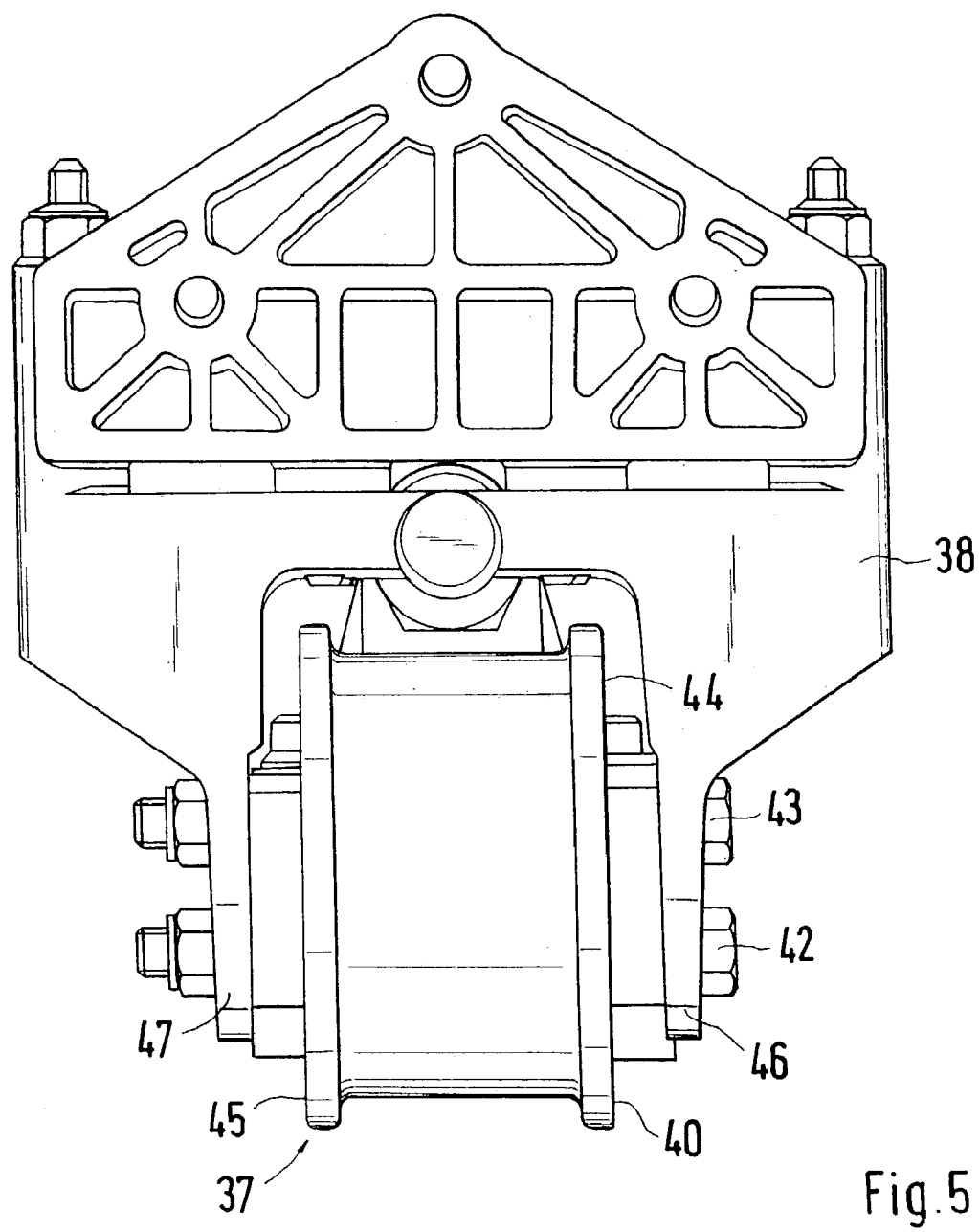
FIG. 5 is a view in the direction of the arrow B of FIG. 4.

The first bearing 18 has a carrying arm 37 fastened on the housing wall 16 of the crankcase 17 and a console carrier 38 mounted on the closing wall 31. The carrying arm 37 and the console carrier 38 interact by an elastic coupling element 39 which comprises a ring carrier 40, an elastic body 41 and fastening bolts 42, 43. The carrying arm 37 is constructionally united with the ring carrier 40 which has boundary planes 44, 45, which extend between upright fork arms 46, 47 of the console carrier 38. The carrying arm 37 is held in position at the crankcase 17 by means of screws 48; the console carrier 38 is held on the closing wall 31 by screws 49. Between the carrying arm 37 and the console carrier 38, a first supporting element 50 and a second supporting element 51, shown in FIG. 4, are provided. The supporting elements 50 and 51 become operative when relative movements, for example, caused by an accident, act upon the drive assembly 10 or the enveloping device 26. The first supporting element 50 and the second supporting element 51 are formed by horizontal bolts 52, 53 which are fastened on the carrying arm 37 or on the console carrier 38. In this case, a defined distance "As" is provided between mutually facing ends 54, 55 of the bolts 52, 53. With a thread, the bolt 50 is axially movably and therefore adjustably constructed in a bearing eye 56.

Figure 6:
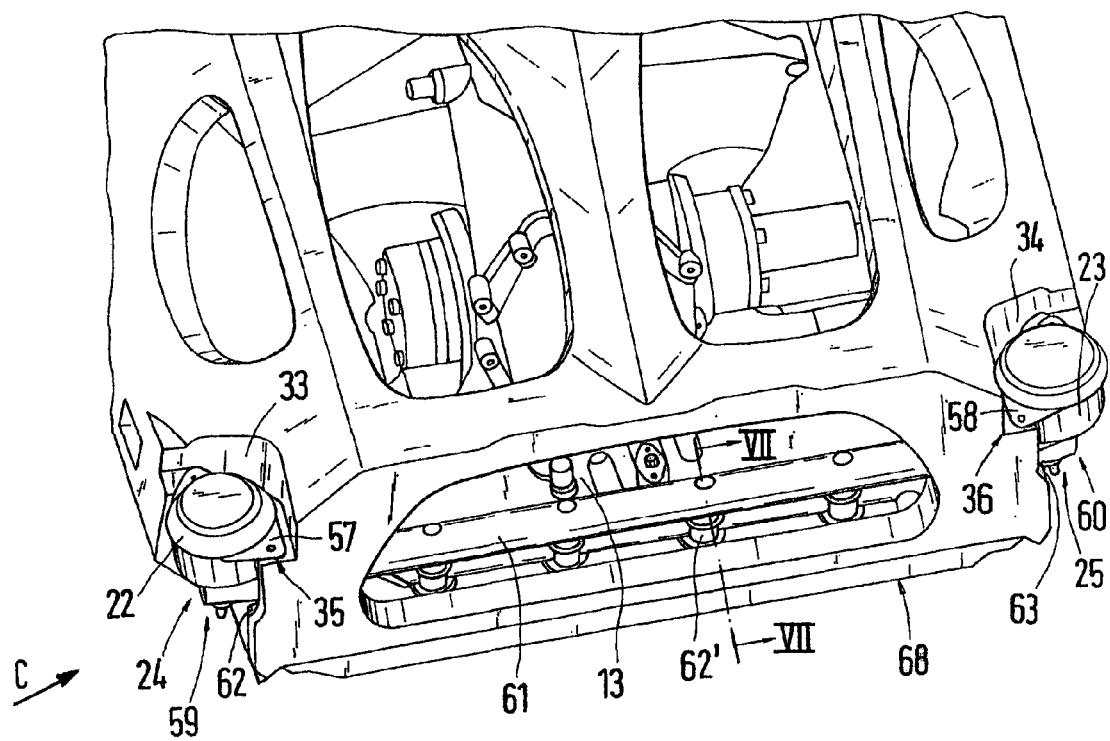
FIG. 6 is a diagonal view from the left top rear onto a rear area of the drive assembly.
Figure 7:
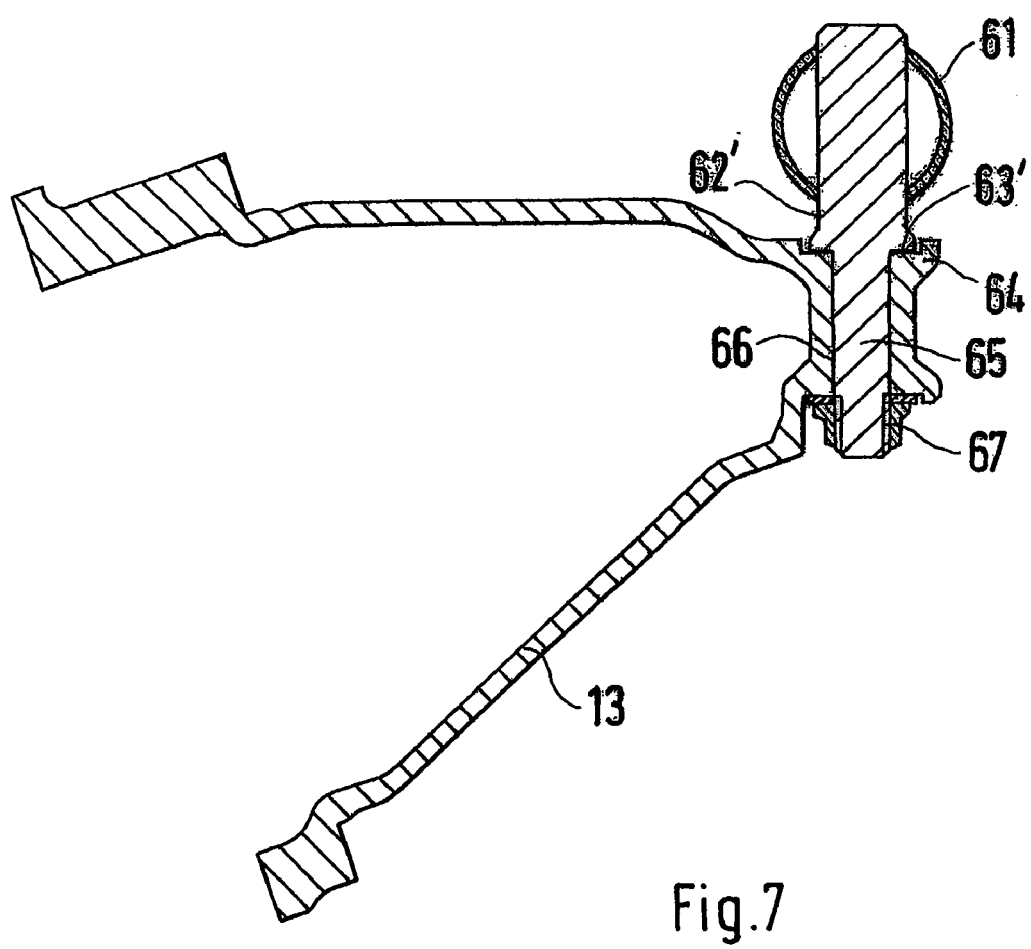
FIG. 7 is a sectional view according to Line VII—VII of FIG. 6.
Figure 8:
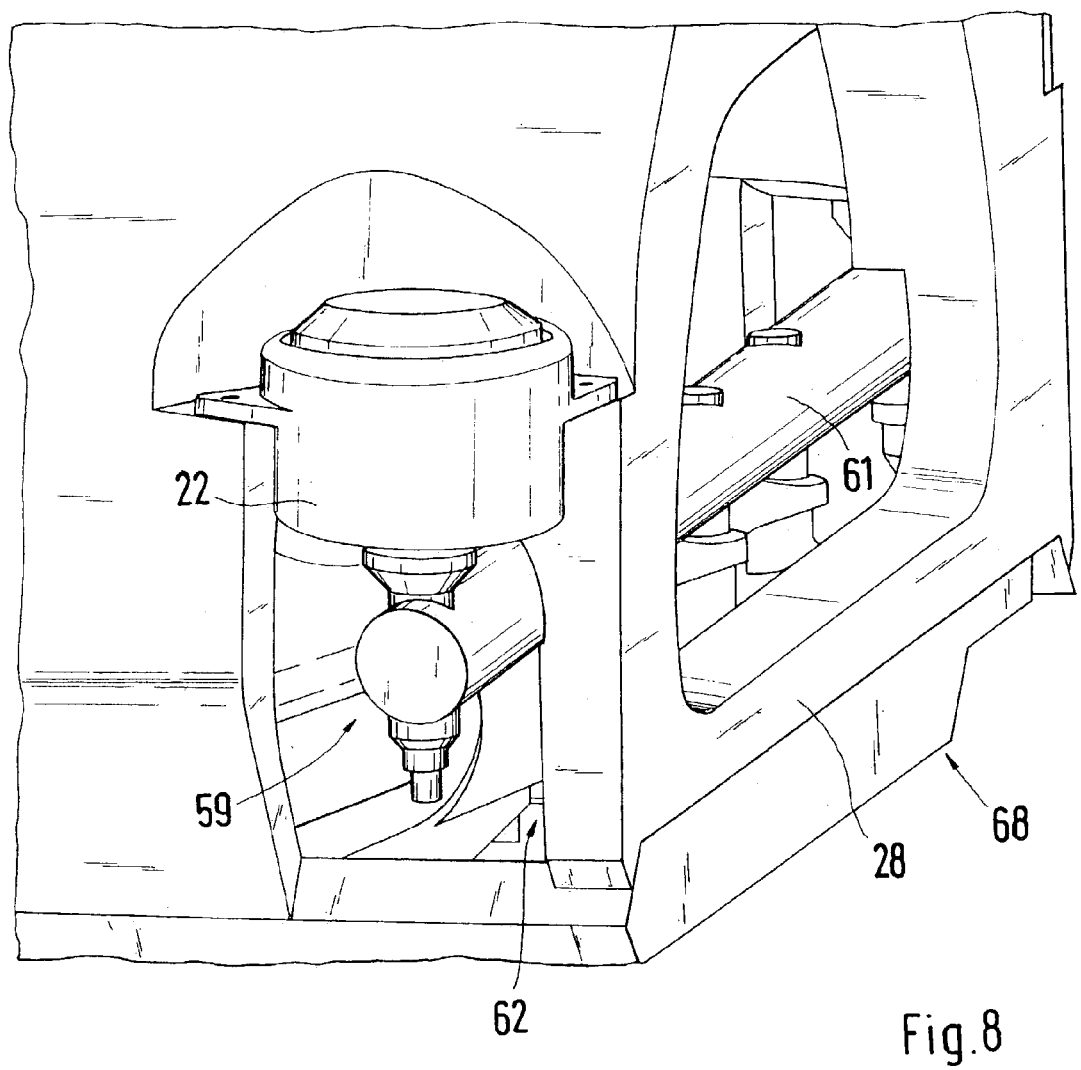
FIG. 8 is a diagonal view approximately in the direction of the arrow C of FIG. 6.

The second bearing 22 and the third bearing 23 are constructed in the manner of hydraulic bearings which, by supporting surfaces 57, 58, extend to the bearing surfaces 35, 36 of the shaped-in areas 33, 34, as shown in FIG. 6. In addition, the bearings 22 and 23 are fastened to free ends 59, 60 of a cross member 61 which penetrates the recesses 62, 63 in the enveloping device 26. The cross member 61 is connected with the transmission 13, as shown in FIG. 7, in such a manner that one or several supporting bolts 62' are mounted on the cross member 61. Each supporting bolt 62' is supported, on the one side, by a collar 63' on a console 64 of the transmission 13 and, on the other side, by a bolt section 65, penetrating a bore 66 of the console 64. Finally, the bolt section 65 is held on the console 64 by a screw nut 67.

The drive assembly 10 and the enveloping device 26 may be assembled as a preassembled constructional unit which is united with the passenger car 1 during the production of the passenger car 1. If the drive assembly 10 is to be removed at a later point in time, only the bottom part 68 of the enveloping device 26 has to be taken off. After the release of the bearings 18, 22 and 23, the drive assembly can be separated from the enveloping device with a swivelling-away movement toward the roadway.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive assembly for a motor vehicle including a vehicle body having a carrying structure, comprising
   a constructional unit including
      an internal combustion engine having a free face,
      a clutch, and
      a transmission having a free end;
   a first bearing disposed in a longitudinal center plane of the vehicle on the free face of the internal combustion engine, the first bearing engaging a first bearing receiving device of the carrying structure; and
   a second bearing and a third bearing mounted outside the longitudinal center plane at the free end of the transmission, the second bearing and third bearing being held in second and third bearing receiving devices of the carrying structure in position, wherein the carrying structure includes an enveloping device made of a high-strength material, the enveloping device at least partially surrounding the drive assembly and including the first, second and third bearing receiving devices, and wherein the high-strength material includes a glass-fiber-reinforced plastic material.

2. A drive assembly for a motor vehicle including a vehicle body having a carrying structure, comprising
   a constructional unit including
      an internal combustion engine having a free face,
      a clutch, and
      a transmission having a free end;
   a first bearing disposed in a longitudinal center plane of the vehicle on the free face of the internal combustion engine, the first bearing engaging a first bearing receiving device of the carrying structure; and
   a second bearing and a third bearing mounted outside the longitudinal center plane at the free end of the transmission, the second bearing and third bearing being held in second and third bearing receiving devices of the carrying structure in position, wherein the carrying structure includes an enveloping device made of a high-strength material, the enveloping device at least partially surrounding the drive assembly and including the first, second and third bearing receiving devices, and wherein the first bearing receiving device is disposed on an upright closing wall of the carrying structure.

3. The drive assembly according to claim 2, wherein the first bearing receiving device comprises a local thickening in the closing wall.

4. The drive assembly according to claim 2, wherein the internal combustion engine includes V-shaped cylinder rows and a horizontal housing wall disposed between the cylinder rows, and wherein the first bearing includes a carrying arm fastened to the housing wall and a console carrier mounted an the closing wall, the carrying arm and the console carrier engaging with each other by way of an elastic coupling element which comprises a ring carrier, an elastic body and fastening bolts.

5. The drive assembly according to claim 4, wherein the carrying arm is united with the ring carrier including boundary planes extending between upright fork arms of the console carrier.

6. The drive assembly according to claim 4, further comprising a first supporting element and a second supporting element both disposed between the carrying arm and the console carrier, which first supporting element and second supporting element have a supporting effect when relative movements act in the longitudinal direction of the vehicle upon the drive assembly.

7. The drive assembly according to claim 6, wherein the first supporting element and the second supporting element each include a horizontally aligned bolt, the bolts being arranged at a pre-defined distance.

8. A vehicle comprising:
   a vehicle body including a longitudinal center plane, and
a carrying structure including
first, second and third bearing receiving devices;
a drive assembly including
a constructional unit including
an internal combustion engine having a free face,
a clutch, and
a transmission having a free end;
a first bearing disposed in the longitudinal center plane of the vehicle body on the free face of the internal combustion engine, the first bearing engaging the first bearing receiving device of the carrying structure; and
a second bearing and a third bearing mounted outside the longitudinal center plane of the vehicle body at the free end of the transmission, the second bearing and third bearing being held in second and third bearing receiving devices of the carrying structure in position, wherein the carrying structure includes an enveloping device made of a high-strength material, the enveloping device at least partially surrounding the drive assembly and including the first, second and third bearing receiving devices, and wherein the high-strength material includes a glass-fiber-reinforced plastic material.

9. A vehicle comprising:
a vehicle body including
a longitudinal center plane, and
a carrying structure including
first, second and third bearing receiving devices;
a drive assembly including
a constructional unit including
an internal combustion engine having a free face,
a clutch, and
a transmission having a free end;
a first bearing disposed in the longitudinal center plane of the vehicle body on the free face of the internal combustion engine, the first bearing engaging the first bearing receiving device of the carrying structure; and
a second bearing and a third bearing mounted outside the longitudinal center plane of the vehicle body at the free end of the transmission, the second bearing and third bearing being held in second and third bearing receiving devices of the carrying structure in position, wherein the carrying structure includes an enveloping device made of a high-strength material, the enveloping device at least partially surrounding the drive assembly and including the first, second and third bearing receiving devices, wherein the high-strength material includes a glass-fiber-reinforced plastic material, and wherein the carrying structure includes an upright closing wall, and the first bearing receiving device is disposed on the upright closing wall of the carrying structure.

10. The vehicle according to claim 9, wherein the first bearing receiving device comprises a local thickening in the closing wall.

11. The vehicle according to claim 9, further comprising an elastic coupling element which comprises a ring carrier, an elastic body and fastening bolts, wherein the internal combustion engine includes V-shaped cylinder rows and a horizontal housing wall disposed between the cylinder rows, and wherein the first bearing includes a carrying arm fastened to the housing wall and a console carrier mounted on the closing wall, the carrying arm and the console carrier engaging with each other by way of the elastic coupling element.

12. The vehicle according to claim 11, wherein the console carrier includes upright fork arms, and wherein the carrying arm is united with the ring carrier including boundary planes extending between the upright fork arms of the console carrier.

13. The vehicle according to claim 11, further comprising a first supporting element and a second supporting element both disposed between the carrying arm and the console carrier, which first supporting element and second supporting element have a supporting effect when relative movements act in the longitudinal direction of the vehicle upon the drive assembly.

14. The vehicle according to claim 13, wherein the first supporting element and the second supporting element each include a horizontally aligned bolt, the bolts being arranged at a pre-defined distance.

15. A method for making a drive assembly for a motor vehicle including a vehicle body having a carrying structure, the drive assembly comprising a constructional unit including an internal combustion engine having a free face, a clutch, and a transmission having a free end, the method comprising:
disposing a first bearing in a longitudinal center plane of the vehicle on the free face of the internal combustion engine, the first bearing engaging a first bearing receiving device of the carrying structure;
mounting a second bearing and a third bearing outside the longitudinal center plane at the free end of the transmission, the second bearing and third bearing being held in second and third bearing receiving devices of the carrying structure in position, wherein the carrying structure includes an enveloping device made of a high-strength material, the method further comprising at least partially surrounding the drive assembly with the enveloping device, wherein the enveloping device includes the first, second and third bearing receiving devices; and
disposing the first bearing receiving device on an upright closing wall of the carrying structure.

16. The method according to claim 15, wherein the internal combustion engine includes V-shaped cylinder rows and a horizontal housing wall disposed between the cylinder rows, and the method further comprising fastening a carrying arm of the first bearing to the housing wall and mounting a console carrier of the first bearing on the closing wall, the carrying arm and the console carrier engaging with each other by way of an elastic coupling element which comprises a ring carrier, an elastic body and fastening bolts.

* * * * *